(No Model.) 2 Sheets—Sheet 1.

R. S. POLLARD.
EDUCATIONAL APPLIANCE.

No. 375,095. Patented Dec. 20, 1887.

Witnesses.
Will R. Onohundro,
W. W. Elliott

Inventor:
Rebecca S. Pollard
By Jno. G. Elliott
Atty.

(No Model.)  2 Sheets—Sheet 2.
R. S. POLLARD.
EDUCATIONAL APPLIANCE.
No. 375,095. Patented Dec. 20, 1887.
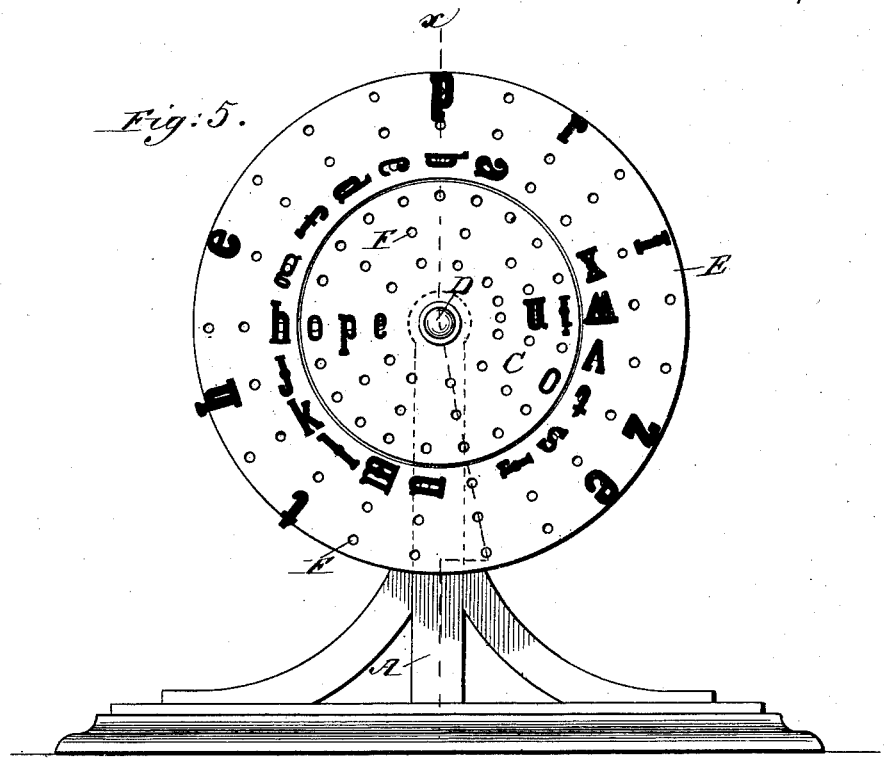
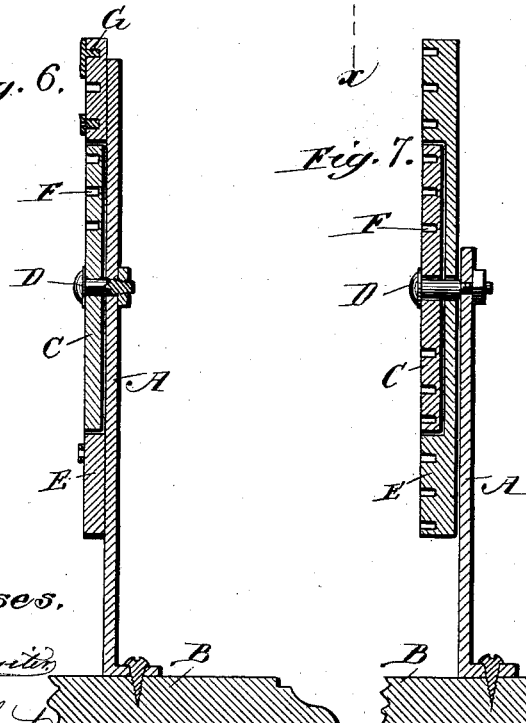
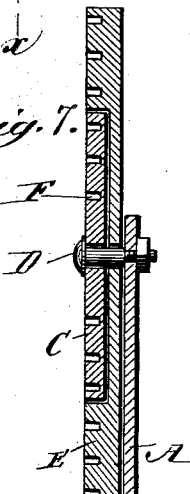
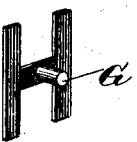
Witnesses.
Inventor
Rebecca S. Pollard

UNITED STATES PATENT OFFICE.

REBECCA S. POLLARD, OF CHICAGO, ILLINOIS.

EDUCATIONAL APPLIANCE.

SPECIFICATION forming part of Letters Patent No. 375,095, dated December 20, 1887.

Application filed August 8, 1887. Serial No. 246,381. (No model.)

*To all whom it may concern:*

Be it known that I, REBECCA S. POLLARD, a citizen of the United States, residing in Chicago, county of Cook, and State of Illinois, have invented certain new and useful Improvements in Educational Appliances, of which the following is a specification.

My invention relates more particularly to synthetic educational appliances, and has for its object to provide an apparatus consisting of two or more plates connected together and shifting upon or within each other, and having upon their faces series of characters, which, upon a proper shifting of the plates, form and convey to the eye and mind different impressions, meanings, and objects which singly or improperly grouped they do not indicate, whereby the mind of a student is trained by the constructive and synthetic methods in the formation of objects, characters, and the language.

Another object of this invention is to render the learning of orthoepy, reading, and arithmetic more easy and pleasurable to the juvenile student by providing a mechanical device for teaching the same having two or more plates, each having thereon removable sets of letters or figures, and each set forming a part of different words or sums, while the other set consists of an alphabet, or part of one, or a series of numerals, whereby, when one of said sets is shifted relative to the other, various words and sums are produced as a result of the different combinations of letters and figures.

Other objects are to provide a mechanical device for teaching orthoepy, reading, and arithmetic by the synthetic method, whereby a large number of words and sums may be produced from a given arrangement of letters or figures in two sets or series by shifting one set, forming a part of the words or sum relative to the other set, which forms the remaining part of the words or sums; to provide two or more plates or disks, one or more of which may be movable, and on each of which, respectively, are a series of letters or figures forming parts of words or sums, which, when brought into proper alignment with each other by the movement of one or more of the plates, produce various combinations of letters and figures forming any number of words or sums, and to provide certain details of construction in the carrying out of my invention, all as illustrated in the accompanying drawings, in which—

Figure 1:
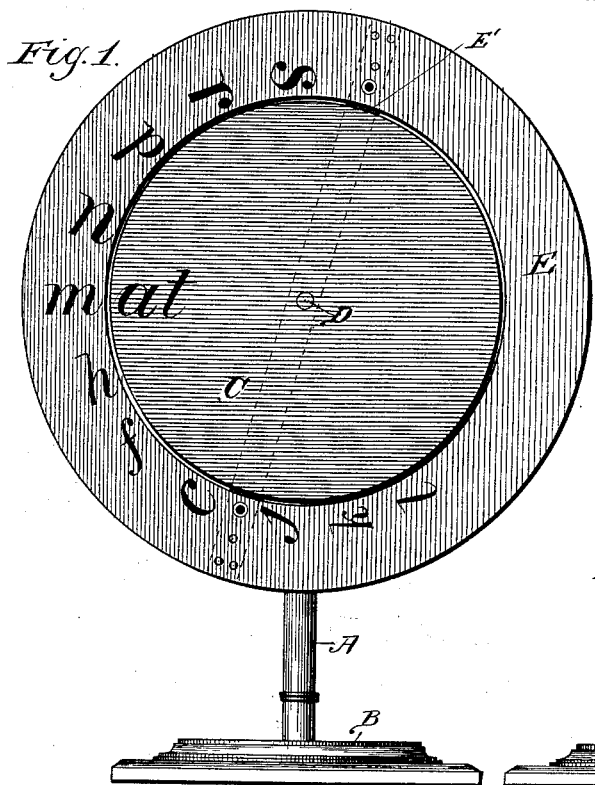
Figure 2:
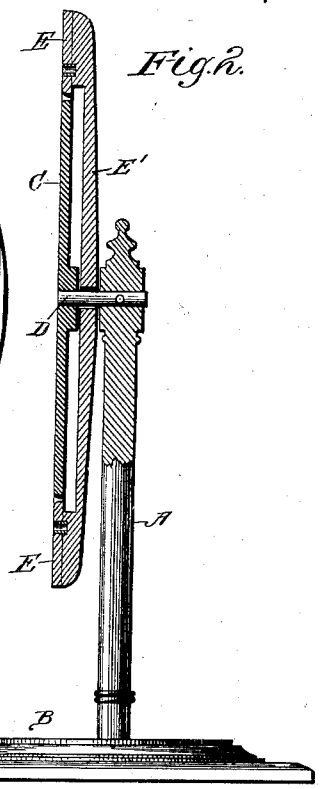
Figure 3:
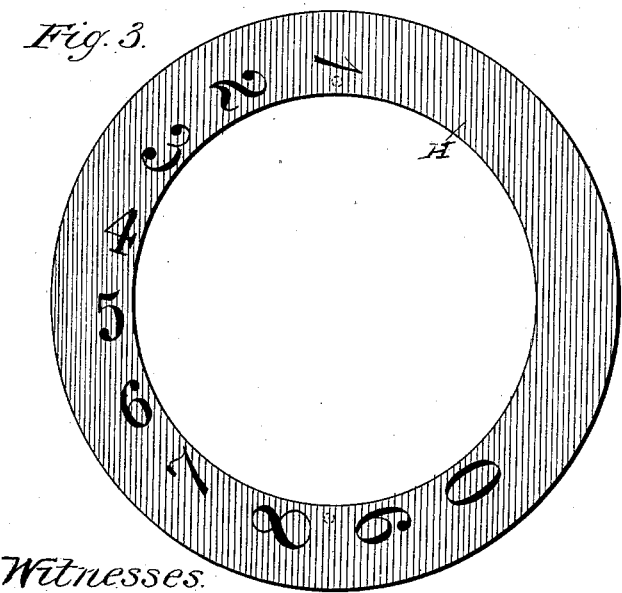
Figure 4:
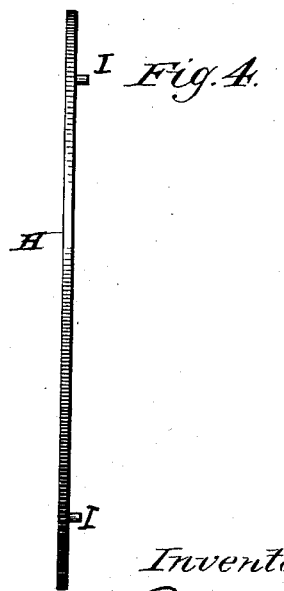

Figure 1 represents a front elevation of a device embodying my invention; Fig. 2, a central vertical section of the same; Fig. 3, a face view of a supplemental ring or plate; Fig. 4, a side elevation of the same; Fig. 5, a front elevation of my device when perforated to secure detachable characters; Fig. 6, a section of the same on line $x\,x$, Fig. 5; Fig. 7, a similar view of a modification, and Fig. 8 a perspective view of one of the detachable characters.

Similar letters of reference indicate the same parts in the several figures of the drawings.

Referring by letter to the accompanying drawings, A represents a standard or support, of any desired material or configuration, mounted upon a suitable base, B, for convenience of manipulation and having secured to the upper end thereof a circular plate, C, by means of a bolt, D, passing axially through said plate, upon which, however, the plate preferably does not rotate, and lying flush therewith and surrounding said plate is an annular or ring-like plate, E, to the rear face of which is secured a bar, E', spanning the opening in said plate centrally and constituting the pivot upon which the said ring rotates about the fixed center plate, C, the bolt D passing loosely and axially through said bar, so as to serve both as a pivot and support. However, my invention is not limited to this particular construction for the plate E. Instead of being ring-like in form, it may be a disk with the plate C working on the face thereof, or the latter plate may be set in a circular recess formed in the face of the former, and the said plate E may then be rigidly secured to its support; or, as shown in Fig. 7, the plate C may be axially pivoted and rotatable upon the same bolt which pivots the plate E. So, also, it would be no departure from my invention to have more than two plates, one or more of which would be rotatable, or to dispense entirely with the connecting-bolt and make such a connection between the plates that one or more of them would be movable upon or within the next adjoining plate; but for clearness of illustration and for the purposes of description I prefer to show and describe my invention in its simplest form—that is to say, composed of two plates only, with a pivot connection therefor.

By preference, the faces of the plates and also the supplemental plate or ring, hereinafter referred to, are given a blackboard or other erasive surface finish, and the characters marked thereon with chalk or other substance readily erasable; but the characters may be permanently formed and detachable from the disks by mechanical means, such as pins and holes, or in any other convenient manner; and in view of the fact that the arrangement of the characters on the plates, both when erasable and detachable, is substantially the same, the operation of my invention will be described in connection with the permanently-formed but detachable characters now to be described.

As shown in Figs. 5 to 7, inclusive, the plates may be provided with a number of holes or perforations, F, in series, which holes or perforations extend radially from the common axis, and in which are designed to be inserted the pin G, attached to any suitable character or figure which it is desired to attach to one of the plates to form a part of any series of characters, which pins in practice are rigidly secured to the rear face of each character, so that each and every character is complete of itself. Such a detachable connection of course renders the characters readily removable from the plate, and hence any character may be shifted from one plate to another, or from one series to another, so as to produce a totally new combination of characters.

The principal use for which my invention is designed is the teaching of orthoepy, but also orthography, to juvenile students, and in the latter instance, particularly, words of one syllable, also the primary numbers and the fundamental rules of arithmetic, consisting of addition, subtraction, multiplication, and division; and the manner of its use is substantially as follows: The consonants of the alphabet are placed at a point corresponding with the inner concentric row of perforations upon the outer plate, and several other letters, which, when combined with different initial consonants form different words, are placed radially—that is to say, on a line conforming to that of the perforations of the inner plate—with the first letter over the first perforation, next the outside edge thereof—such, for instance, as the letters "o p e," which, when turned opposite the letter "c" of the consonant series, form "cope," when moved opposite "d" make "dope," and so on around the series, forming successively "hope," "lope," "mope," "pope," and "rope." By changing the words of the inner plate to "in" or "at," &c., a large number of different words may be formed by shifting the position of these letters with reference to the consonant series on the outer plate without making any change in said series, as will obviously occur to any one making use of the device, as will also the changes which may be made in the use of long and short vowels in the first place on the inner plate, and likewise in the formation of words and sets of words on either plate in the teaching of reading. In teaching arithmetic—for example, addition—figures are substituted for the letters, and a series of numbers—say from 1 to 20—placed over the inner circle of perforations in the outer plate. Then the figure "3," for instance, is placed on the inner plate over the second series of perforations with the plus-sign preceding it and the sign of equality following it, and hence when the plates are shifted relative to each other the student reads, 2+3=5 and 5+3=8, and so on, the sum of the numbers each time being supplied by the student, and it will readily be seen that subtraction, multiplication, and division may be taught in the same way by simply a change of the signs.

The object of making the inner plate fixed is that all the words may be read in a horizontal position at the same point, which in some cases may be found desirable, because the words are more easily read in that position.

When for any reason it is desirable not to disturb the characters upon the plates, and particularly the outer plate, I propose to employ one or more supplemental rings or plates, H, (shown in Figs. 3 and 4,) having therein the desired characters and removably attached to the fixed ring or plate by means of pins I or other suitable or well-known attaching devices.

In conclusion, I may add that although the method and manner of use of my invention, as herein described, are the preferred and the purpose for which it is especially designed, I do not desire to limit myself thereto, for various other characters and signs besides letters and figures may be removably or detachably secured to my movable plate or plates or supplemental plates for the formation of distinctive and varying characters without departing from the spirit of my invention.

Having described my invention, what I claim, and desire to secure by Letters Patent, is—

1. Two or more plates connected together and shifting upon or within each other and having the faces thereof provided with a series of removable characters, substantially as described.

2. Two or more plates pivoted upon and rotatable about a common axis, one of which plates may be fixed, in combination with series of characters removably placed upon each of said plates, substantially as described.

3. Two or more plates pivoted upon and rotatable about a common axis, one of which plates may be fixed and all of which plates are provided with radial circumferential series of perforations, in combination with series of characters having pins or projections thereon fitting the perforations in said plates for removably securing said characters thereto, substantially as described.

REBECCA S. POLLARD.

Witnesses:
W. W. ELLIOTT,
WILL R. OMOHUNDRO.